United States Patent
Chen et al.

(10) Patent No.: US 8,622,638 B1
(45) Date of Patent: Jan. 7, 2014

(54) PROTECTION CAP FOR PROTECTING CAMERA MODULE

(71) Applicant: Hon Hai Precision Industry Co., Ltd., New Taipei (TW)

(72) Inventors: Shin-Wen Chen, New Taipei (TW); Wen-Chang Chen, New Taipei (TW); Yu-Tsan Cheng, New Taipei (TW); Yu-Shu Lin, New Taipei (TW); Chien-Liang Chou, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/726,657

(22) Filed: Dec. 26, 2012

(30) Foreign Application Priority Data

Aug. 31, 2012 (CN) .......................... 2012 1 0317693

(51) Int. Cl.
*G03B 17/56* (2006.01)

(52) U.S. Cl.
USPC .......................................................... 396/448

(58) Field of Classification Search
USPC ..................................... 396/448, 529; 359/511
See application file for complete search history.

(56) References Cited

U.S. PATENT DOCUMENTS

| 4,383,565 A * | 5/1983 | Denmat ..................... 206/316.1 |
| 4,549,589 A * | 10/1985 | Nguyen ..................... 206/316.2 |
| 4,601,318 A * | 7/1986 | Diegelman ................. 206/316.2 |
| 5,294,954 A * | 3/1994 | Nomura et al. ............... 396/448 |
| 6,971,754 B2 * | 12/2005 | Flora ............................. 359/511 |
| 7,744,296 B2 * | 6/2010 | Wu et al. ....................... 396/529 |
| 7,880,132 B2 * | 2/2011 | Brodie et al. ................. 250/239 |
| 2003/0112364 A1 * | 6/2003 | Tanida et al. ................. 348/375 |
| 2010/0302638 A1 * | 12/2010 | Cuadra ........................ 359/511 |

* cited by examiner

*Primary Examiner* — W B Perkey
(74) *Attorney, Agent, or Firm* — Altis Law Group, Inc.

(57) ABSTRACT

A protection cap for protecting a camera module slides over a lens barrel receiving at least one lens. The protection cap is made of elastic material and is hollow. The protection cap includes an enclosed end and an open end. The lens barrel is passed through the open end and the open end sleeves over the camera module. The enclosed end protects the camera module against damage and contamination.

4 Claims, 6 Drawing Sheets

PROTECTION CAP FOR PROTECTING CAMERA MODULE

BACKGROUND

1. Technical Field

The present disclosure relates to protective covers, and particularly, to a protection cap for protecting a camera module.

2. Description of Related Art

Many electronic devices are equipped with a camera module. A protective film is applied to a camera module before the camera module is assembled to the electronic device, to protect the camera module from contamination or scratches. After assembling, the protective film is removed to allow the camera module to be used. However, the removal of the protective film may leave traces of adhesive on the camera module, which may prejudice the performance of the camera module.

Therefore, it is desirable to provide a protection cap for protecting a camera module, which can overcome the limitations described.

DETAILED DESCRIPTION

Embodiments of the disclosure will be described with reference to the drawings.

Figure 1:
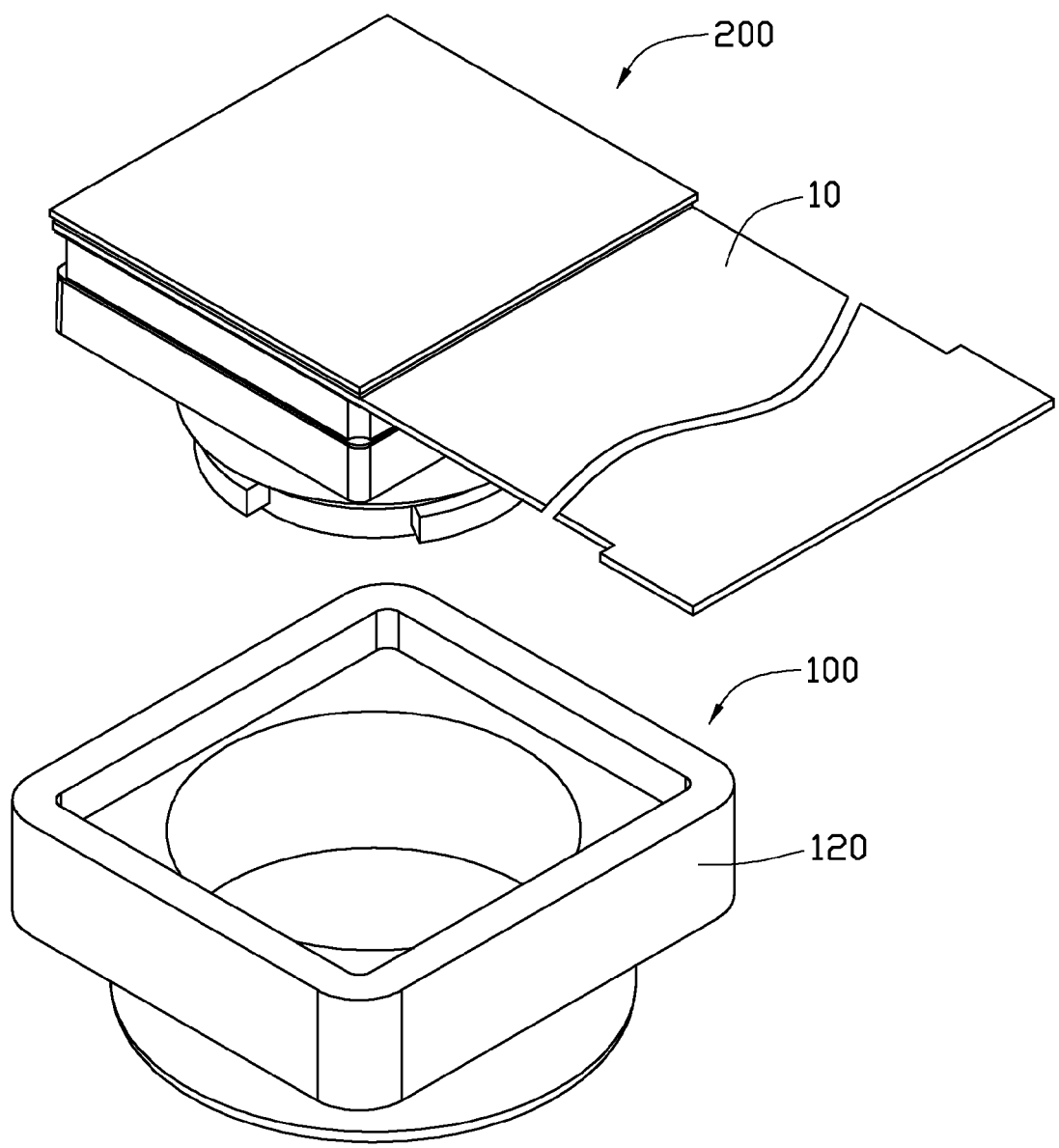
FIG. 1 is an isometric view of a protection cap for protecting a camera module before the protection cap is assembled to the camera module, in accordance with a first embodiment.
Figure 2:
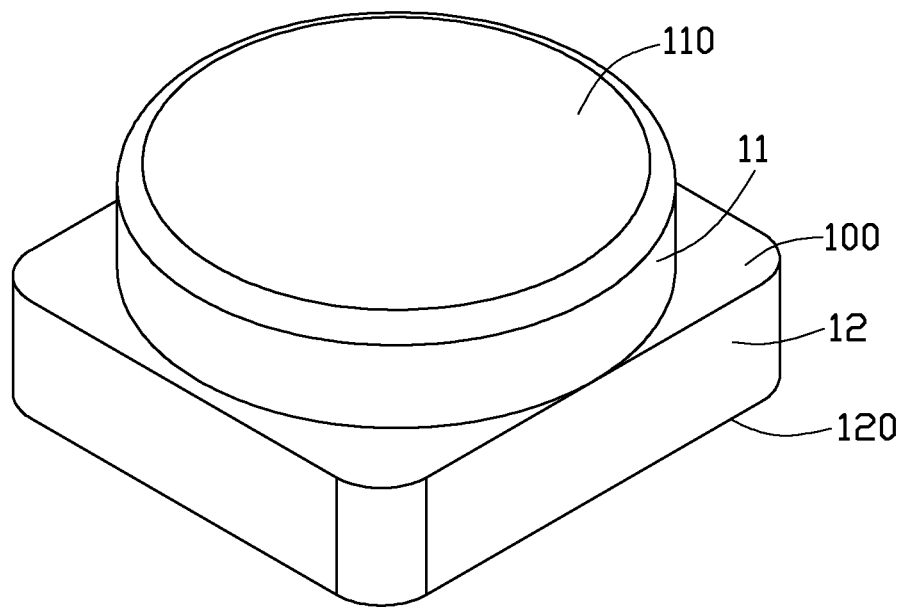
FIG. 2 is similar to FIG. 1, but viewed from another angle.
Figure 2:
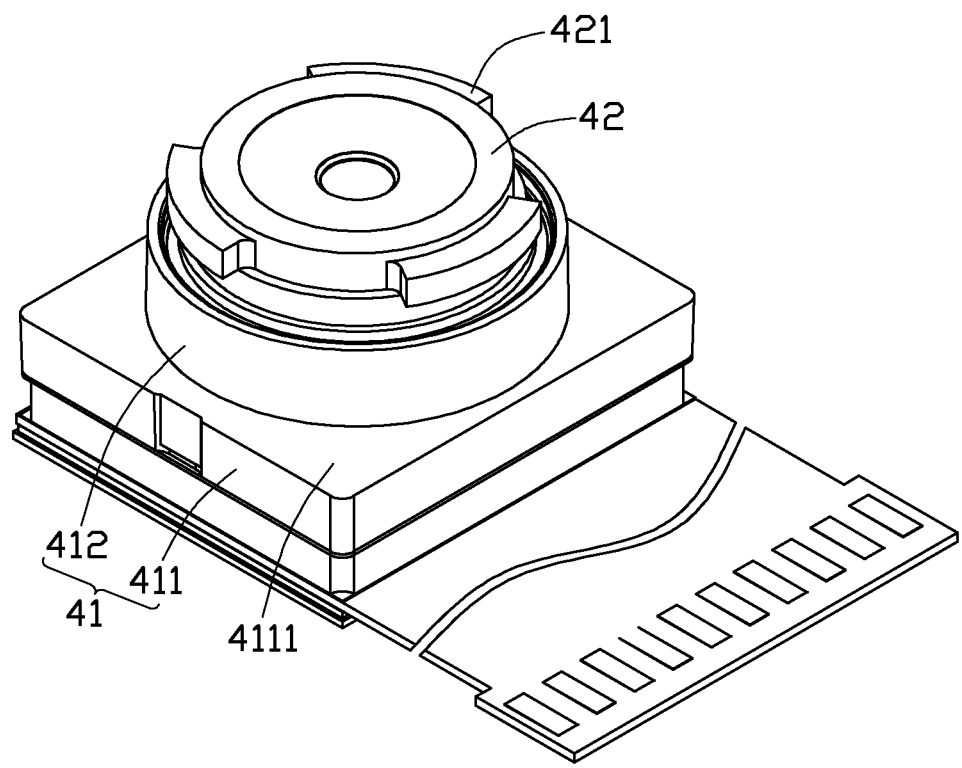

FIGS. 1 and 2 show a protection cap 100 for protecting a camera module 200 in accordance with a first embodiment.

Figure 3:
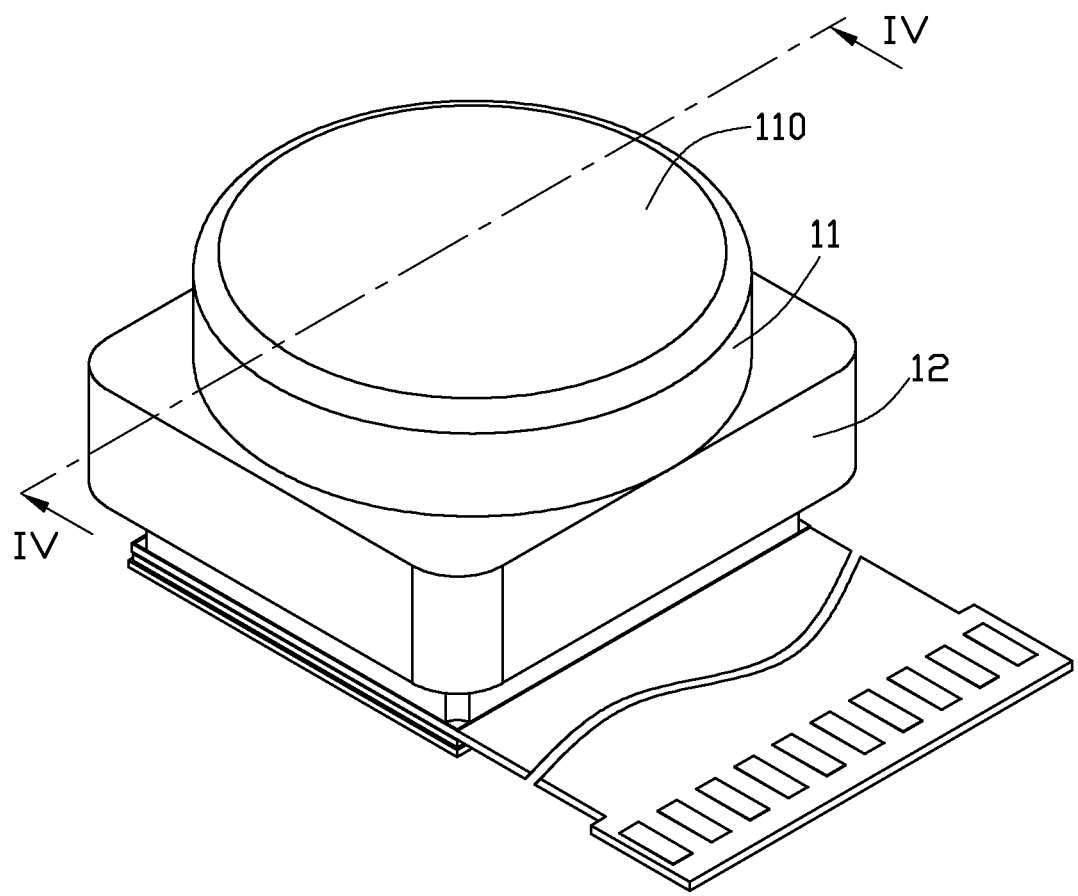
FIG. 3 is an isometric view of the protection cap for the camera module of FIG. 2, when the protection cap is assembled to the camera module.
Figure 4:
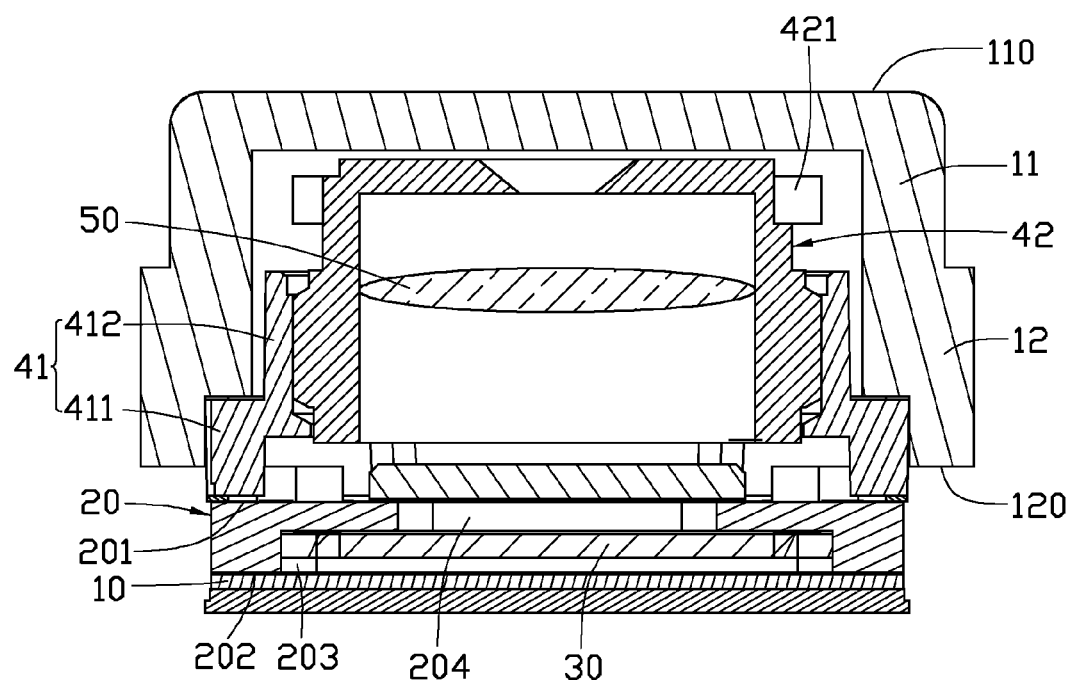
FIG. 4 is a cross-sectional view taken along a line IV-IV of FIG. 3.

Also referring to FIGS. 3 and 4, the camera module 200 includes a printed circuit board (PCB) 10, a ceramic substrate 20, an image sensor 30, a lens holder 41, a lens barrel 42, and at least one lens 50.

The PCB 10 is a flexible PCB. The ceramic substrate 20 includes an upper surface 201 and a lower surface 202 opposite to the upper surface 201. The ceramic substrate 20 defines a receiving recess 203 on the lower surface 202 and a light passing hole 204 through the upper surface 201 and the lower surface 202. The light passing hole 204 is in communication with the receiving recess 203. The lower surface 202 is attached to the PCB 10 such that the ceramic substrate 20 is mounted on the PCB 10.

The image sensor 30 is received in the receiving recess 203 and faces the light passing hole 204. The image sensor 30 is electrically connected to the printed circuit board through conductive leads (not shown) buried in the ceramic substrate 20. In the embodiment, the image sensor 30 can be a complementary metal-oxide-semiconductor transistor (CMOS) sensor or a charge coupled device (CCD) sensor.

The lens holder 41 includes a substantially square seat 411 and a substantially cylindrical engaging portion 412. The seat 411 is hollow and includes a connection surface 4111. The engaging portion 412 is hollow and perpendicularly extends from the connection surface 4111. The engaging portion 412 is coaxial with the seat 411 and is in communication with the seat 411. The connection surface 4111 surrounds the engaging portion 412. An end surface of the seat 411 facing away from the engaging portion 412 is attached (adhesively or otherwise) to the upper surface 201 of the ceramic substrate 20. The ceramic substrate 20 is positioned between the lens holder 41 and the printed circuit board 10, the end surface of the seat 411 facing away from the engaging portion 412 is enclosed by the ceramic substrate 20 and the printed circuit board 10.

The lens barrel 42 is a hollow cylinder. An outer diameter of one end of the lens barrel 42 corresponds to an inner diameter of the engaging portion 412 such that the lens barrel 42 is partially received in the engaging portion 412. In alternative embodiments, the engaging portion 412 includes inner screw threads (not shown), and the lens barrel 42 includes outer screw threads (not shown). The engaging portion 412 and the lens barrel 42 are then screwed together. The at least one lens 50 is received in the lens barrel 42. The lens barrel 42 includes a number of arced ribs 421 extending from and around an outer surface of the lens barrel 42. The arced ribs 421 are uniformly distributed and face away from the engaging portion 412. A distance from the outermost surface of each arced rib 421 to a center axis of the lens barrel 42 is less than a half of an outer diameter of the engaging portion 412.

The protection cap 100 is made of elastic material, with an enclosed end 110 and an open end 120. In the embodiment, the protection cap 100 is made of rubber. The protection cap 100 is hollow and includes a cylindrical receiving portion 11 and a square receiving portion 12. The cylinder receiving portion 11 extends from a square receiving portion 12. An inner diameter of the cylindrical receiving portion 11 is slightly greater than the outer diameters of the lens barrel 42 and the engaging portion 412. The cylindrical receiving portion 11 is used to receive the lens barrel 42 and the engaging portion 412. A shape of the square receiving portion 12 substantially corresponds to the shape of the seat 411. The square receiving portion 12 is used to compactly envelop the seat 411.

The enclosed end 110 is one end of the cylindrical receiving portion 11 furthest from the square receiving portion 12 and the open end 120 is one end of the square receiving portion 12 furthest from the cylindrical receiving portion 11, the enclosed end 110 and the open end 120 being the two opposite ends of the protection cap 100.

In use, the lens barrel 42 and the engaging portion 412 are passed through the open end 120 and received in the cylindrical receiving portion 11. The square receiving portion 12 receives and sleeves over the seat 411. Thereby the protection cap 100 is engaged with the camera module 200. The enclosed end 110 of the protection cap 100 encloses the lens barrel 42 to protect the at least one lens 50 from damage and contamination.

In alternative embodiments, the receiving portion 11 can also be square in section.

In alternative embodiments, the ceramic substrate 20 is omitted. The seat 411 is directly adhered to the printed circuit board 10.

Figure 5:
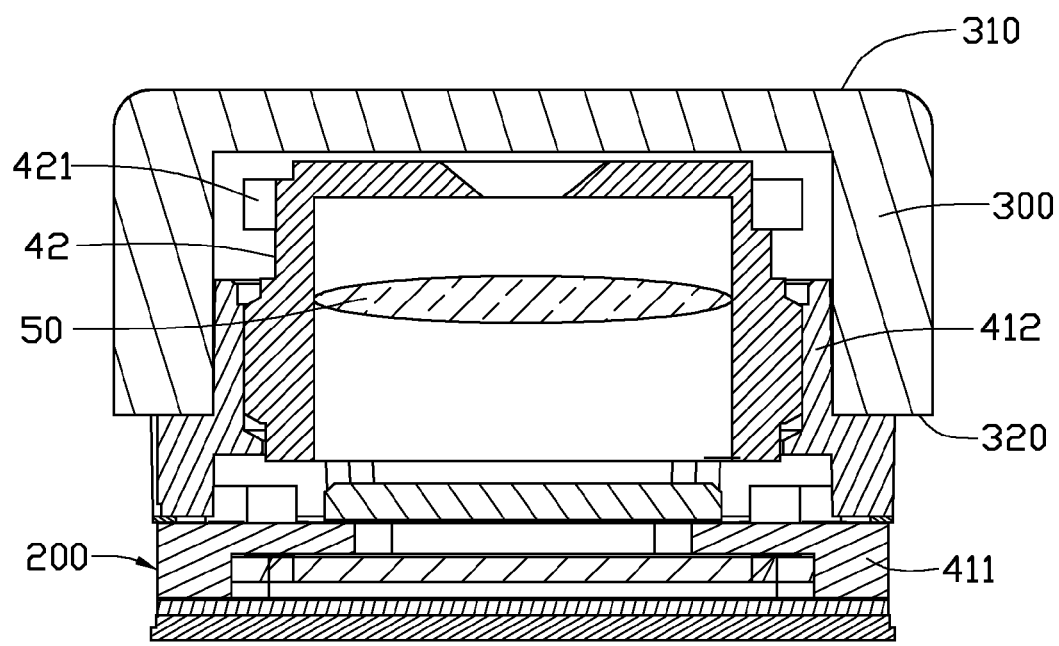
FIG. 5 is a cross-sectional view a protection cap for protecting the camera module of FIG. 1, in accordance with a second embodiment.

FIG. 5 shows a protection cap 300 for protecting the camera module 200 in accordance with a second embodiment. The protection cap 300 is made of elastic material such as rubber. The protection cap 300 is substantially a hollow cylinder and an inner diameter of the protection cap 300 is slightly less than the outer diameter of the engaging portion 412. The protection cap 300 includes an enclosed end 310 and an open end 320. In use, the lens barrel 42 and the engaging portion 412 are passed through the open end 320. The open end 320 compactly sleeves over the engaging portion 412. Thereby the protection cap 300 is engaged with the camera module 200. The enclosed end 310 of the protection cap 300 encloses the lens barrel 42 for protection.

Figure 6:
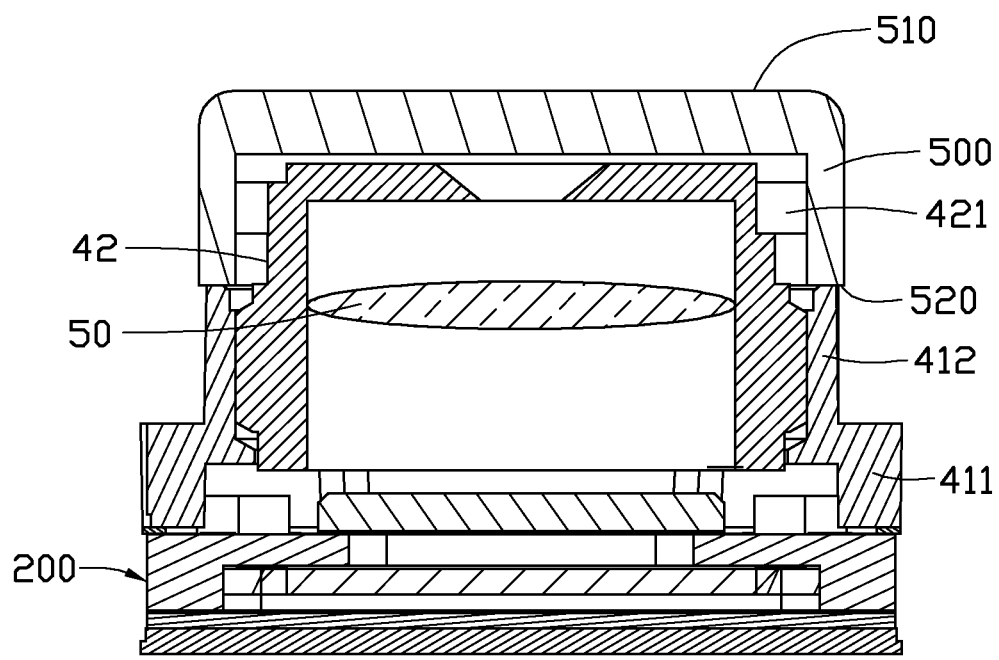
FIG. 6 is a cross-sectional view a protection cap for protecting the camera module of FIG. 1, in accordance with a third embodiment.

FIG. 6 shows a protection cap 500 for protecting the camera module 200 in accordance with a third embodiment. The protection cap 500 is made of elastic material such as rubber. The protection cap 500 is substantially a hollow cylinder and an inner diameter of the protection cap 500 is slightly less than the outer diameter of the lens barrel 42. The protection cap 500 includes an enclosed end 510 and an open end 520. In use, the lens barrel 42 is passed through the open end 520. The open end 520 sleeves over the outer surfaces of the arced ribs 421 of the lens barrel 42. Thereby the protection cap 500 is engaged with the camera module 200. This protection cap 500 also protects the lens barrel 42 by virtue of the enclosed end 510.

In alternative embodiments, the lens barrel 42 does not include the arced ribs 421 such that the size of the protection cap 500 is reduced.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A protection cap for protecting a camera module, the camera module comprising a lens barrel receiving at least one lens, the protection cap being made of elastic material and being hollow, the protection cap comprising an enclosed end and an open end;

wherein the lens barrel is passed through the open end, the open end sleeves over the camera module, and the enclosed end encloses the lens barrel, the camera module comprises a lens holder, the lens holder comprises a square seat and a cylinder engaging portion connected to the seat, the lens barrel is received in the engaging portion, the protection cap comprises a square receiving portion and a cylindrical receiving portion extending from the square receiving portion, the lens barrel and the engaging portion are received in the cylindrical receiving portion, the square receiving portion sleeves over the seat.

2. The protection cap of claim 1, wherein the enclosed end is one end of the cylindrical receiving portion furthest from the square receiving portion, the open end is one end of the square receiving portion furthest from the cylindrical receiving portion.

3. The protection cap of claim 1, wherein the lens barrel comprises a number of arced ribs extending from an outer surface of the lens barrel, the protection cap is a hollow cylinder, the open end sleeves over the arced ribs.

4. The protection cap of claim 1, wherein the protection cap is made of rubber.

* * * * *